(12) United States Patent
Liu et al.

(10) Patent No.: US 11,493,028 B2
(45) Date of Patent: Nov. 8, 2022

(54) MOUNTING FRAME, ENERGY STORAGE UNIT, PITCH SYSTEM, WIND TURBINE AND METHOD

(71) Applicant: BEIJING GOLDWIND SCIENCE & CREATION WINDPOWER EQUIPMENT CO., LTD., Beijing (CN)

(72) Inventors: Yuliang Liu, Beijing (CN); Fanhu Meng, Beijing (CN); Bing Zhu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 314 days.

(21) Appl. No.: 16/753,760

(22) PCT Filed: Apr. 18, 2019

(86) PCT No.: PCT/CN2019/083203
§ 371 (c)(1),
(2) Date: Apr. 3, 2020

(87) PCT Pub. No.: WO2020/042633
PCT Pub. Date: Mar. 5, 2020

(65) Prior Publication Data
US 2020/0271106 A1    Aug. 27, 2020

(30) Foreign Application Priority Data

Aug. 31, 2018    (CN) .......................... 201811014030.2

(51) Int. Cl.
*F03D 80/80*    (2016.01)
*F03D 9/11*    (2016.01)
*F03D 13/20*    (2016.01)

(52) U.S. Cl.
CPC ................ *F03D 80/82* (2016.05); *F03D 9/11* (2016.05); *F03D 13/20* (2016.05);
(Continued)

(58) Field of Classification Search
CPC . F03D 80/82; F03D 80/88; F03D 9/11; F03D 13/20; F03D 7/0244; F05B 2220/30;
(Continued)

(56) References Cited

U.S. PATENT DOCUMENTS

| 9,926,908 | B2 | 3/2018 | Nielsen et al. | |
| 2006/0277843 | A1* | 12/2006 | Livingston | F03D 13/10 52/110 |
| 2016/0312766 | A1* | 10/2016 | Rasmussen | F03D 1/065 |

FOREIGN PATENT DOCUMENTS

| CN | 106415001 A | 2/2017 |
| CN | 207526637 U | 6/2018 |

(Continued)

OTHER PUBLICATIONS

International Search Report and Written Opinion in corresponding PCT Application No. PCT/CN2019/083203, dated Jun. 20, 2019, 11 pages.

(Continued)

*Primary Examiner* — Christopher Verdier
*Assistant Examiner* — Maxime M Adjagbe
(74) *Attorney, Agent, or Firm* — Bayes PLLC (57) ABSTRACT

The disclosure relates to a mounting frame, an energy storage unit, a pitch system, a wind turbine and a method. The mounting frame for mounting accumulators in a hub includes: a base having a predetermined thickness, wherein the base includes a mounting surface in a thickness direction of the base; and two or more accumulator mounting elements disposed on the mounting surface at intervals, wherein each accumulator mounting element includes a
(Continued)

supporting assembly and a holding assembly connected to the supporting assembly, the supporting assembly is connected to the mounting surface and extends in the thickness direction, and the holding assembly is adapted to clamp and fix the accumulator such that all the accumulators in the hub are mounted to the mounting frame.

19 Claims, 8 Drawing Sheets

(52) U.S. Cl.
CPC ....... *F05B 2220/30* (2013.01); *F05B 2240/21* (2013.01); *F05B 2240/50* (2013.01); *F05B 2260/74* (2013.01); *F05B 2260/76* (2013.01)

(58) Field of Classification Search
CPC .............. F05B 2240/21; F05B 2240/50; F05B 2270/604; F05B 2260/74; F05B 2260/76; F05B 2260/79; F15B 2201/40; F15B 2201/4056; F16L 3/1091; F16L 3/22; F16L 3/221; F16L 3/223; F16L 3/1207
See application file for complete search history.

(56) References Cited

FOREIGN PATENT DOCUMENTS

| | | |
|---|---|---|
| CN | 207777065 U | 8/2018 |
| CN | 109356793 A | 2/2019 |
| DE | 19739164 A1 | 3/1999 |
| GB | 2526277 A | 11/2015 |
| WO | 2011063815 A1 | 6/2011 |

OTHER PUBLICATIONS

First Office action issued in corresponding Chinese Application No. 201811014030.2, dated Jun. 6, 2019, 8 pages.

Extended European Search Report issued in corresponding European Application No. EP 19 85 3748, dated Sep. 21, 2020, 7 pages.

* cited by examiner

MOUNTING FRAME, ENERGY STORAGE UNIT, PITCH SYSTEM, WIND TURBINE AND METHOD

CROSS-REFERENCE TO RELATED APPLICATIONS

This application is a National Stage of International Application No. PCT/CN2019/083203, filed Apr. 18, 2019, which based on and claims priority to Chinese Patent Application No. 201811014030.2, filed on Aug. 31, 2018, both of which are incorporated herein by reference in their entireties.

FIELD

The present disclosure relates to the technical field of wind power generation, and in particular, to a mounting frame, an energy storage unit, a pitch system, a wind turbine and a method.

BACKGROUND

A pitch system is one of core parts of large wind turbine control system, and is very important for safe, stable and efficient operation of the wind turbine.

In prior art, there are generally two driving methods for the pitch system. One is a motor actuator, and the other is a hydraulic actuator. The hydraulic actuator plays a major role in current pitch control and is particularly suitable for large wind turbine applications, due to its high response frequency, large torque, centralized arrangement and integration or other advantages. When the hydraulic actuator is in use, it needs to be equipped with a corresponding accumulator to store energy for it. The hydraulic actuator for each blade on the hub needs to be equipped with an accumulator. In a wind turbine, the accumulators corresponding to the hydraulic actuators for respective blades are generally connected to the inner wall surface of the hub and arranged close to the blades.

Although the above means can meet the requirements for accumulator installation and energy storage, they also have deficiencies. Since there are usually two or more blades on each hub, the accumulators corresponding to the hydraulic actuators for the two or more blades need to be mounted on the surface of the hub near respective blades, which occupies a lot of internal space of the hub. More importantly, since the blades are distributed at a certain angular interval on the hub, the installation positions of the accumulators are scattered accordingly, and the surface of the hub near the blades is rugged. Thus, it is very inconvenient to mount the accumulators connected at these positions. To sum up, in prior art, the installation and maintenance of the accumulator are also extremely difficult. Furthermore, the pitch systems in prior art are scattered at respective blade mounting holes. The maintenance of all the pitch systems can only be carried out when all blades are locked. Locking all blades will take a long time and increase downtime and maintenance costs of wind turbine.

SUMMARY

Embodiments of the present disclosure provide a mounting frame, an energy storage unit, a pitch system, a wind turbine and a method. The mounting frame may mount the accumulators corresponding to the hydraulic actuators for respective blades, occupy a small space, has a low cost and make the installation and maintenance of the accumulator easier.

In a first aspect, embodiments of the disclosure provide a mounting frame for mounting accumulators in a hub, including: a base having a predetermined thickness, wherein the base includes a mounting surface in a thickness direction of the base; and two or more accumulator mounting elements disposed on the mounting surface at intervals, wherein each accumulator mounting element includes a supporting assembly and a holding assembly connected to the supporting assembly, the supporting assembly is connected to the mounting surface and extends in the thickness direction, and the holding assembly is adapted to clamp and fix the accumulator such that all the accumulators in the hub are mounted to the mounting frame.

In a second aspect, embodiments of the disclosure provide an energy storage unit including an accumulator and the above mounting frame, wherein the holding assembly of the accumulator mounting element clamps and fixes the accumulator.

In a third aspect, embodiments of the disclosure provide a pitch system for a wind turbine, wherein the wind turbine includes a hub, and the pitch system includes: the above energy storage unit, wherein the energy storage unit is adapted to be disposed in an internal space of the hub and connected to the inner wall surface of the hub; a pitch bearing including an inner ring and an outer ring that are rotationally connected, wherein one of the inner ring and the outer ring is adapted to be connected to a blade mounting hole of the hub; and a hydraulic actuator connected to the other of the inner ring and the outer ring and connected to the accumulator so as to drive a relative rotation of the inner ring and the outer ring.

In a fourth aspect, embodiments of the disclosure provide a wind turbine including: a hub including an internal space, an inner wall surface surrounding the internal space and a plurality of blade mounting holes communicating with the internal space; and the above pitch system, wherein the energy storage unit is disposed in the internal space of the hub and connected to the inner wall surface of the hub through the base and the supporting assembly of at least one accumulator mounting element, and one of the inner ring and the outer ring of pitch bearing is connected to the blade mounting hole.

In a fifth aspect, embodiments of the disclosure provide a method for mounting an energy storage unit, including steps of: providing a mounting frame, which includes a base and accumulator mounting elements, wherein the base has a predetermined thickness and includes a mounting surface in a thickness direction of the base, there are two or more accumulator mounting elements disposed on the mounting surface at intervals, each accumulator mounting element includes a supporting assembly and a holding assembly connected to the supporting assembly, the supporting assembly is connected to the mounting surface and extends in the thickness direction; mounting an accumulator, wherein the accumulator is mounted on the accumulator mounting element such that the accumulator is clamped in the holding assembly of the accumulator mounting element in which the accumulator is located and thus an energy storage unit is formed; and mounting the energy storage unit, wherein the energy storage unit is moved into the internal space of the hub and connected to an inner wall surface of the hub through the base and the supporting assembly.

For the mounting frame, the energy storage unit, the pitch system, the wind turbine and the method according to embodiments of the disclosure, the mounting frame includes a base and two or more accumulator mounting elements, the base includes a mounting surface in its thickness direction, and the two or more accumulator mounting elements are disposed at intervals on the mounting surface. The mounting frame can be provided for installation of the accumulator. Specifically, the accumulators corresponding to the hydraulic actuators for each blade of the wind turbine can be clamped and fixed in the holding assemblies of a group of accumulator mounting elements of the mounting frame. The accumulators corresponding to the hydraulic actuators for respective blades of the wind turbine can all be mounted to the mounting frame, which results in intensively mounting, compact structure and small footprint. More importantly, it is possible to mount all the accumulators to the corresponding accumulator mounting elements, and then move the mounting frame containing respective accumulators into the internal space of the hub and connect the mounting frame to the inner wall surface. Such installation is simple. Moreover, when one or two or more of the accumulators are damaged, the maintenance may be carried out only after the hub is locked.

BRIEF DESCRIPTION OF THE DRAWINGS

The features, advantages, and technical effects of the exemplary embodiments of the present disclosure will be described below with reference to the drawings.

REFERENCE SIGNS IN THE DRAWINGS 1 hub;
101 internal space;
102 blade mounting hole;
103 manhole;
104 generator shaft hole;
105 inner wall surface;
106 rotation axis;
2 energy storage unit;
201 rotation axis;
3 pitch bearing;
301 inner ring;
302 outer ring;
100 mounting frame;
100a rotation axis;
10 base;
11 mounting surface;
12 fixing surface;
13 through hole;
20 accumulator mounting element;
21 supporting assembly;
211 connecting plate;
211a first plate portion;
211b second plate portion;
212 supporting beam;
22 holding assembly;
221 first holding element;
221a first recess;
222 second holding element;
222a second recess;
223 holding hole;
224 limiting element;
224a protruding unit;
225 fastener;
30 elastic support;
40 bridge assembly;
41 leg;
411 first end;
412 second end;
413 perforation;
414 cable fixing element;
414a fixing ring;
50 valve block fixing base;
200 accumulator;
300 valve block;
X thickness direction;
Y first direction;
Z second direction.

In the drawings, same reference sign refers to same component. The drawings are not drawn to actual scale.

DETAILED DESCRIPTION

Features in various aspects and exemplary embodiments of the disclosure are described in detail below. In the following detailed description, numerous specific details are set forth in order to help thorough understanding of the disclosure. However, it is obvious to those skilled in the art that the disclosure may be implemented without some of these specific details. The following descriptions of the embodiments are merely intended to provide better understanding of the disclosure by illustrating examples of the disclosure. The disclosure is not limited to any specific configuration and algorithm presented hereinafter; and any modification, replacement and improvement of elements, members and algorithms are covered in the scope of the disclosure without departing from the spirit of the disclosure. In the drawings and the following description, well-known structures and techniques are not illustrated to avoid unnecessarily obscuring the disclosure. For clarity, the dimensions of some of the structures may be exaggerated. Furthermore, the features, structures, or characteristics described hereinafter may be combined in any suitable manner in one or more embodiments.

The orientation words appearing in the following description are all directions shown in the drawings, which are not intended to limit the specific structure of the mounting frame, the energy storage unit, the pitch system, the wind turbine and the method according to the disclosure. In the description of the disclosure, it should also be noted that the terms "mount" and "connect" are to be understood broadly, maybe, for example, a fixed connection, a detachable connection, or an integral connection; they can be connected directly or indirectly. For those of ordinary skill in the art, the specific meanings of the above terms in the disclosure can be understood according to actual circumstance.

For better understanding of the disclosure, a mounting frame, an energy storage unit, a pitch system, a wind turbine and a method according to embodiments of the disclosure will be described below in detail with reference to FIGS. 1 to 9.

Figure 1:
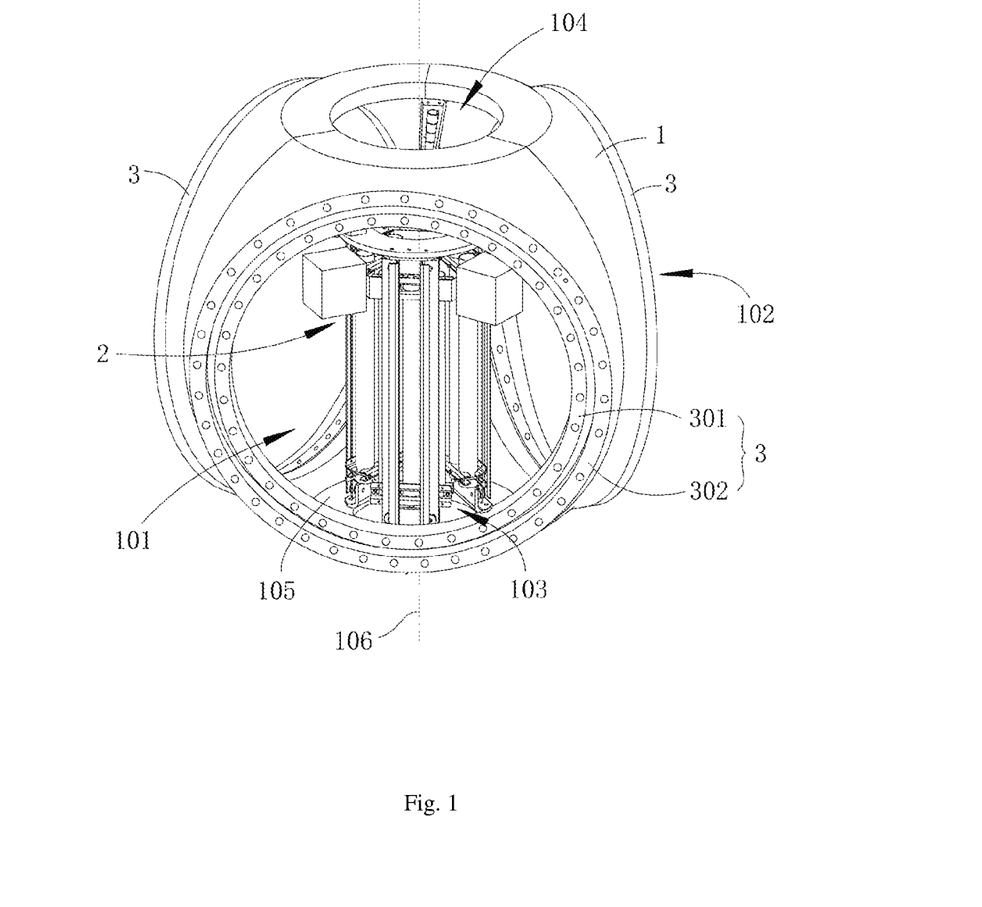
FIG. 1 is a partial structural schematic diagram of a wind turbine according to embodiments of the disclosure.

FIG. 1 is a partial structural schematic diagram of a wind turbine according to an embodiment of the disclosure. With reference to FIG. 1, embodiments of the disclosure provide a wind turbine, which mainly includes a hub 1, blades (not shown) and a pitch system.

The hub 1 includes an internal space 101, an inner wall surface 105 surrounding the internal space 101, a plurality of blade mounting holes 102 communicating with the internal space 101, and a rotation axis 106. Each blade mounting hole 102 is adapted to connect a blade, and an axis of the mounting hole 102 intersects the rotation axis 106 of the hub 1. The blade mounting holes 102 and the blades are the same in number and are provided in one-to-one correspondence. In order to more clearly show the structure of the wind turbine, the embodiment and following embodiments are illustrated with three blade mounting holes 102. It should be noted that this is an example. The number of the blade mounting holes 102 can also be adjusted according to type of the wind turbine, power generation requirements, and the like.

In order to facilitate the connection between the hub 1 and a generator shaft and facilitate a staff getting access into the internal space 101, the hub 1 further includes a manhole 103 and a generator shaft hole 104 communicating with the internal space 101. Optionally, the manhole 103 and the generator shaft hole 104 may be coaxially arranged, and axes of the manhole 103 and the generator shaft hole 104 may intersect the axes of the three blade mounting holes 102. Furthermore, in order to optimize the structure of the hub 1, a line connecting both centers of the manhole 103 and the generator shaft hole 104 coincides with the rotation axis 106 of the hub 1.

The blades are specifically connected to the corresponding blade mounting holes 102 of the hub 1 through a pitch system. The pitch system drives the blades to enable pitch varying and thereby ensures the power generation benefit of the wind turbine. Therefore, in order to better drive the blades to enable pitch varying, the pitch system according to embodiments of the disclosure optionally includes an energy storage unit 2, a pitch bearing 3, and a hydraulic actuator (not shown). The pitch bearing 3 includes an inner ring 301 and an outer ring 302 that are rotationally connected. One of the inner ring 301 and the outer ring 302 is connected to the blade mounting hole 102 of the hub 1. Each blade mounting hole 102 of the hub 1 is connected with a pitch bearing 3 and is correspondingly provided with a hydraulic actuator. The hydraulic actuator is connected to the other of the inner ring 301 and the outer ring 302 of the corresponding pitch bearing 3 to drive a relative rotation of the inner ring 301 and the outer ring 302 and then enable pitch varying of the blade.

The energy storage unit 2 of the pitch system is disposed in the internal space 101 of the hub 1 and is connected to the inner wall surface 105 of the hub 1. The energy storage unit 2 is adapted to power respective hydraulic actuators of the pitch system. In some alternative examples, each hydraulic actuator may include at least one hydraulic cylinder.

Figure 2:
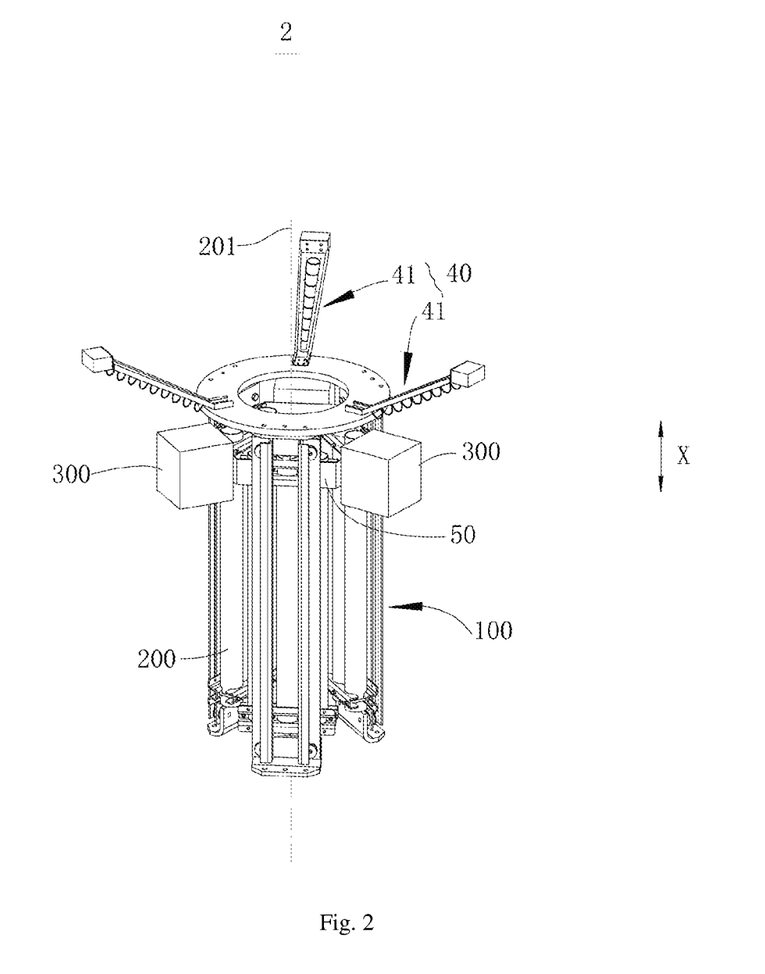
FIG. 2 is a structural schematic diagram of an energy storage unit according to embodiments of the disclosure.

Please refer to FIG. 2. FIG. 2 shows a structural schematic diagram of an energy storage unit 2 according to embodiments of the disclosure. In some optional examples, the energy storage unit 2 includes a mounting frame 100 and an accumulator 200 disposed on the mounting frame 100. The accumulator 200 is connected to the hydraulic actuator. The energy storage unit 2 provides power to the hydraulic actuator through the accumulator 200, and then drives the relative rotation of the inner ring 301 and the outer ring 302 of the corresponding pitch bearing 3 to meet the pitch varying requirements for the blade. There may be more than one accumulators 200. The accumulators 200 may be divided into groups with a same number of the hydraulic actuators. In each group, the accumulators may be connected to one of the hydraulic actuators to provide power to the hydraulic actuator. In each group, there may be one or more accumulators 200.

Figure 3:
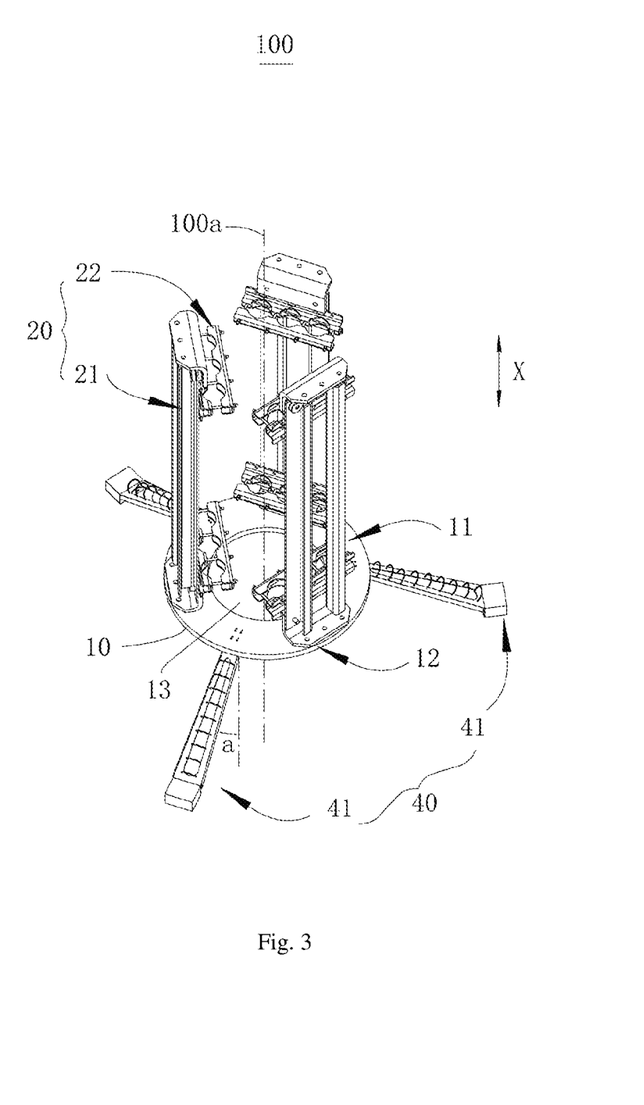
FIG. 3 is a structural schematic diagram of a mounting frame according to embodiments of the disclosure.

Please refer to FIG. 3. FIG. 3 shows a structural schematic diagram of a mounting frame 100 according to embodiments of the disclosure. In order to meet mounting requirements of the accumulators 200 corresponding to the respective hydraulic actuators, in some optional examples, the mounting frame 100 according to embodiments of the disclosure may include a base 10 and two or more accumulator mounting elements 20. The base 10 has a predetermined thickness and includes a mounting surface 11 in a thickness direction X of the base 10. The two or more accumulator mounting element 20 are disposed on the mounting surface 11 at intervals. Each accumulator mounting element 20 includes a supporting assembly 21 and a holding assembly 22. The supporting assembly 21 is connected to the mounting surface 11 and extends in the thickness direction X. The holding assembly 22 is connected to the supporting assembly 21. The holding assembly 22 is capable of clamping and fixing the accumulator 200. The energy storage unit 2 is connected to the inner wall surface 105 of the hub 1 through the base 10 and the supporting assembly 21 of the respective accumulator mounting element 20.

The mounting frame 100 according to embodiments of the disclosure may mount the accumulators 200 corresponding to the hydraulic actuators for respective blades of the wind turbine, which occupies a small space, has a low cost, and enables easy installation and maintenance of the accumulator 200. Moreover, the accumulator 200 can be mounted and maintained only after the hub 1 is locked. Compared with prior art, the locking time for all blades is saved, and the shut-down time, maintenance and replacement costs of the wind turbine are reduced.

Specifically, the base 10 may adopt a disc-shaped structure with different shapes, which may be circular or regular polygon. In this example, a circular disc-shaped structure is used as an example for description. The thickness of the base 10 is not specifically limited, as long as it can meet the mounting and supporting requirements for each accumulator mounting element 20. The base 10 further includes a fixing surface 12 opposite to the mounting surface 11 in the thickness direction X of the base 10.

Since there are three blade mounting holes 102 on the hub 1, it is necessary to divide the accumulators 200 into three groups. In one example, each group of accumulators includes three accumulators 200. In order to ensure that the accumulators 200 corresponding to respective hydraulic actuators can be reliably mounted, the accumulator mounting elements 20 of the mounting frame 100 and the blade mounting holes 102 are the same in number and are provided in one-to-one correspondence. One accumulator mounting element 20 is adapted to mount three accumulators 200 in an accumulator group corresponding to a hydraulic actuator.

Figure 4:
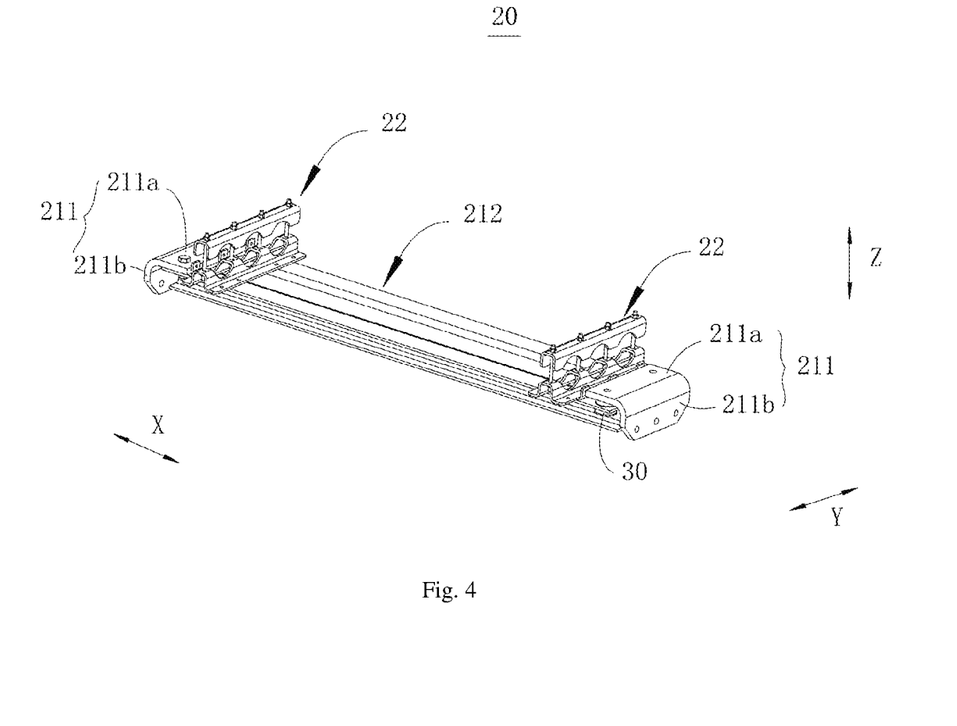
FIG. 4 is an isometric view of an accumulator mounting element according to embodiments of the disclosure from a perspective.
Figure 5:
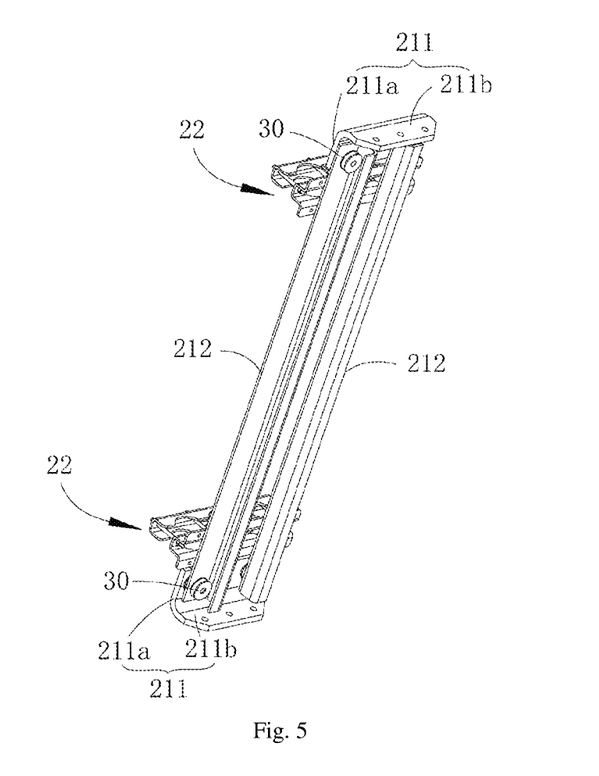
FIG. 5 is an isometric view of an accumulator mounting element according to embodiments of the disclosure from another perspective.

Please refer to FIG. 4 and FIG. 5. FIG. 4 shows an isometric view of an accumulator mounting element 20 according to embodiments of the disclosure from a perspective, and FIG. 5 shows an isometric view of an accumulator mounting element 20 according to embodiments of the disclosure from another perspective. The supporting assembly 21 of the accumulator mounting element 20 includes connecting plates 211 and a supporting beam 212. The supporting beam 212 extends in the thickness direction X, and is connected to two respective connecting plates 211 at respective ends in the thickness direction X. The supporting assembly 21 is connected to the mounting surface 11 of the base 10 through one of the connecting plates 211. With the above structure, the supporting assembly 21 may be conveniently processed and assembled and has high strength and low cost.

The number of supporting beams 212 may be selected according to requirements. There may be one or two or more supporting beams 212. When there are two or more supporting beams 212, they are spaced apart from each other in a first direction Y. The first direction Y intersects, optionally being perpendicular to, the thickness direction X of the base 10. The connecting plate 211 includes a first plate portion 211a and a second plate portion 211b intersecting each other. The connecting plate 211 is connected to the supporting beam 212 through the first plate portion 211a by using a fastener or the like. The second plate portion 211b extends away from the first plate portion 211a, and has a projection in the thickness direction X of the base 10 which covers each of the supporting beams 212. The connecting plate 211 may be in an "L" shape as a whole. With the above arrangement, the supporting assembly 21 can meet its strength requirements and be more conveniently connected to the base 10 and the inner wall surface 105 of the hub 1.

In some implementations, the supporting beam 212 may adopt a channel steel structure with an open groove, and an elastic support 30 may be provided in the open groove and/or between the supporting beam 212 and the connecting plate 211. Since the mounting frame 100 will be connected to the inner wall surface 105 of the hub 1, the elastic support 30 can be provided to resist deformation of the hub 1 in service. Also, the elastic support 30 can prevent vibration of the accumulators 200 mounted on the accumulator mounting element 20 from being transmitted to the hub 1 and thus prevent the hub 1 from being damaged. Optionally, the elastic support 30 may be a structural member having an elastic buffering effect, such as an elastic pad, a spring, a rubber pad or the like.

Figure 6:
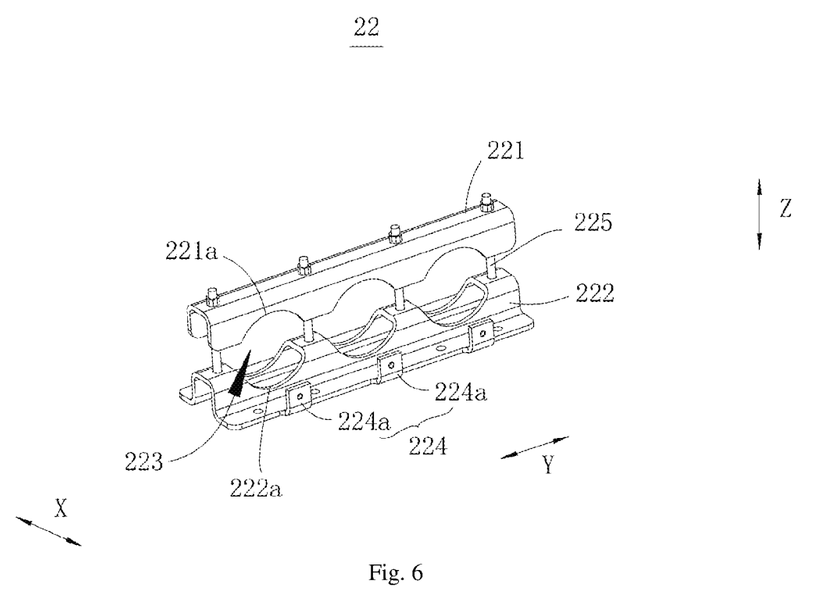
FIG. 6 is a structural schematic diagram of a holding assembly according to embodiments of the disclosure.
Figure 7:
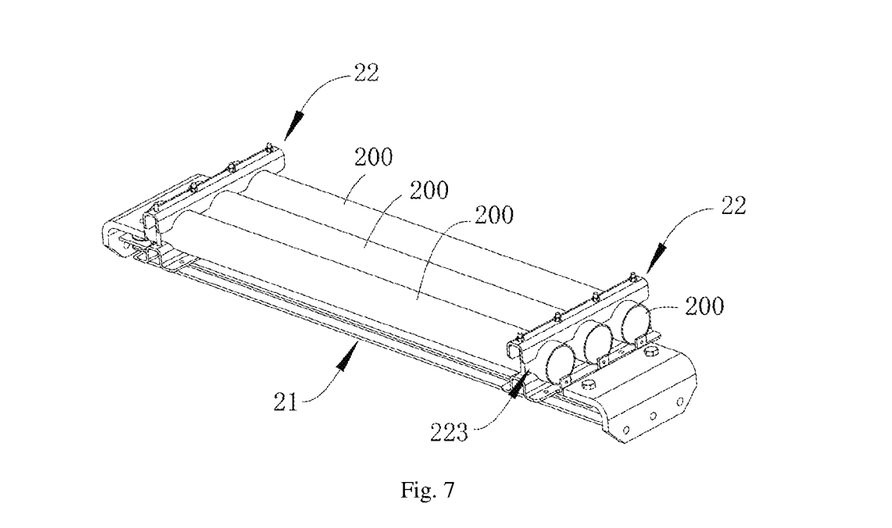
FIG. 7 is a schematic diagram of cooperation between an accumulator mounting element and an accumulator according to embodiments of the disclosure.

Please refer to FIG. 6 and FIG. 7. FIG. 6 shows a structural schematic diagram of a holding assembly 22 according to embodiments of the disclosure, and FIG. 7 shows a schematic diagram of cooperation between an accumulator mounting element 20 and an accumulator 200 according to embodiments of the disclosure. The holding assembly 22 of each accumulator mounting element 20 may be in various forms, as long as the clamping and fixing effect on the corresponding accumulator 200 can be satisfied. In some optional examples, as shown in FIG. 6 and FIG. 7, the holding assembly 22 may include a first holding element 221 and a second holding element 222 which are oppositely disposed and connected to each other. The holding assembly 22 is connected to the supporting assembly 21 through the second holding element 222. Specifically, the holding assembly 22 may be fixedly connected to the supporting assembly 21 by welding or the like, or may be detachably connected to the supporting assembly 21 by bolting or the like. The first holding element 221 and the second holding element 222 together form a holding hole 223. The holding hole 223 has an axis extending in the thickness direction X of the base 10. The accumulator 200 is clamped and fixed in the holding hole 223. With the above structure, the holding assembly 22 can ensure the clamping and fixing force on the corresponding accumulator 200, and ensure that the accumulator 200 will not be detached from the mounting frame 100 during the operation of the wind turbine, thereby ensuring safe operation of the wind turbine.

The holding hole 223 and the accumulator 200 have matching shapes. In one example, the hydraulic actuator for each blade corresponds to three accumulators 200 in an accumulator group, optionally, there are three holding holes 223 formed by the first holding element 221 and the second holding element 222, such that each energy accumulator 200 in the accumulator group can be clamped and fixed.

In some optional examples, the first holding element 221 includes two or more first recesses 221a arranged side by side in the first direction Y, and the second holding element 222 includes second recesses 222a. At least some of the second recesses 222a correspond to the first recesses 221a with one-to-one relation. The first holding element 221 and the second holding element 222 are detachably connected. Particularly, the first holding element 221 and the second holding element 222 may be detachably connected via fasteners 225 such as screws. The first recess 221a and the second recess 222a that are correspondingly disposed form the holding hole 223. With the above structure and detachable connection, the first holding element 221 and the second holding element 222 can conveniently form the holding hole 223 for clamping and fixing the corresponding accumulator 200, and the accumulator 200 can be conveniently mounted and removed. Optionally, the number of the first recesses 221a and the number of the second recesses 222a are the same as the number of the holding holes 223.

When the clamping and fixing requirements of the holding assembly 22 on the accumulator 200 are satisfied, in order to reduce costs, the first holding element 221 and the second holding element 222 can be made of channel steel. The first recess 221a is formed in two flanges of the first holding element 221, and the second recess 222a is formed in a web of the second holding element 222 and extends to flanges of the second holding element 222.

In an optional implementation, the first holding element 221 and/or the second holding element 222 are provided with a limiting element 224. The limiting element 224 extends in a second direction Z. The limiting element 224 has a projection in the thickness direction X which at least partially covers the holding hole 223. The second direction Z intersects both the first direction Y and the thickness direction X of the base 10. Optionally, these three directions are perpendicular to each other.

By arranging the limiting element 224 having a projection in the thickness direction X of the base 10 which at least partially covers the holding hole 223, the accumulator 200 is clamped and fixed in the holding hole 223 of the holding assembly 22. Then, the limiting elements 224 can limit ends of respective accumulators 200 in the thickness direction X of the base 10 and prevent the accumulators 200 from slipping out from the holding holes 223 of the holding assembly 22 due to loosening of the holding assembly 22 or other reasons. It further ensures a reliable connection between the accumulator 200 and the mounting frame 100 during operation of the wind turbine.

The limiting element 224 may adopt different structures, as long as it can meet the limiting requirements. The limiting elements 224 may be a complete protruding structure or may be formed by a plurality of protruding units 224a corresponding to respective holding holes 223 of the holding assembly 22. The protruding units 224a are arranged at intervals in the first direction Y. In a specific implementation, each protruding unit 224a may be arranged corresponding to a holding hole 223. The limiting element 224 and the second holding element 222 may be integrally formed, or may be separately provided and then fixedly or detachably connected to each other, as long as the limit requirements for the accumulator 200 can be satisfied.

It can be understood that the limiting element 224 is not limited to be disposed on the second holding element 222. In some other examples, the limiting element 224 may also be disposed on the first holding element 221. Alternatively, in order to further ensure the limiting effect, the limiting elements 224 may be disposed on both the first holding element 221 and the second holding element 222.

The holding assembly 22 of each accumulator mounting element 20 can be set according to a length of the holding assembly 22 in the thickness direction X of the base 10. When the length of the holding assembly 22 in the thickness direction X is sufficiently long, each accumulator mounting element 20 may include one holding assembly 22. For example, when in the thickness direction X of the base 10, the length of the holding assembly 22 is one third to one half of the length of the accumulator mounting element 20, there may be only one holding assembly 22. When in the thickness direction X of the base 10, the length of the holding assembly 22 is less than one third of the length of the accumulator mounting element 20, each accumulator mounting element 20 may include two or more holding assemblies 22, which are spaced apart from each other in the thickness direction X of the base 10 as long as the accumulator 200 can be reliably clamped and fixed in the corresponding accumulator mounting element 20. When each accumulator mounting element 20 includes two or more holding assemblies 22, the limiting elements 224 may be disposed only on two outermost holding assemblies 22 in the thickness direction X, such that the clamping, fixing and limiting requirements for the accumulator 200 can be further ensured.

When the energy storage unit 2 is connected to the inner wall surface 105 of the hub 1 through its mounting frame 100, the base 10 of the mounting frame 100 can be directly connected to the inner wall surface 105 of the hub 1, or can be indirectly connected to the inner wall surface 105 of the wheel hub 1 through other transition pieces. Optionally, referring to FIG. 1 to FIG. 3, the mounting frame 100 according to embodiments of the disclosure further includes a bridge assembly 40 connected to the fixing surface 12 of the base 10. The base 10 can be supported by the bridge assembly 40 and connected to the inner wall surface 105 of the hub 1. With the bridge assembly 40, the connection strength between the base 10 and the hub 1 can be ensured, and also it is convenient to mount the energy storage unit 2 in the hub 1.

Figure 8:
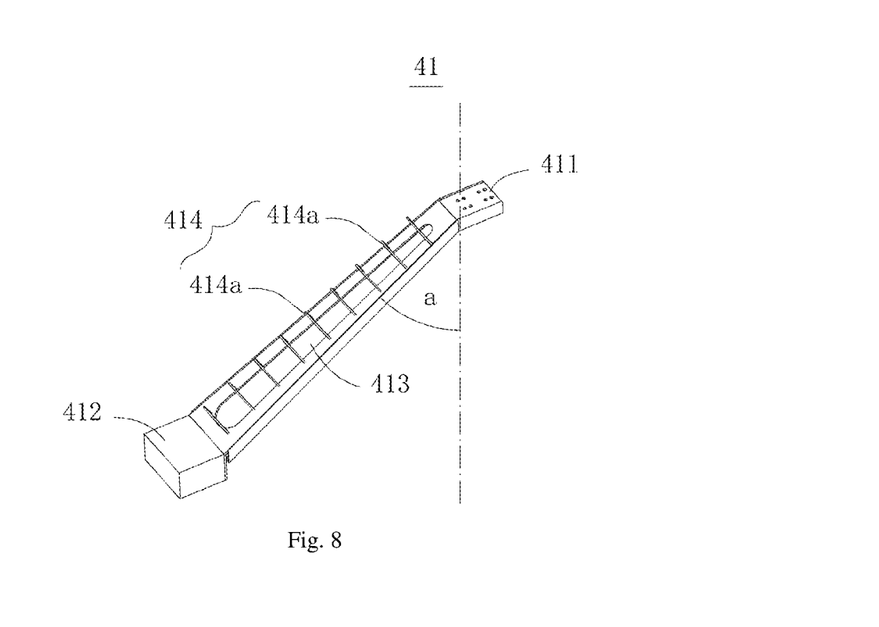
FIG. 8 is a structural schematic diagram of a leg according to an embodiment of the disclosure.

Please refer to FIG. 8. FIG. 8 shows a structural schematic diagram of a leg 41 according to an embodiment of the disclosure. As an optional implementation, the bridge assembly 40 includes a plurality of legs 41, each of which includes a first end 411 and a second end 412 that are opposite to each other. The first ends 411 of the legs 41 are all connected to the fixing surface 12 of the base 10, and the second ends 412 extend away from each other. The extending direction of the leg 41 intersects the thickness direction X of the base 10 with an angle a, wherein angle a is any value between 30° and 90°, including an endpoint 30°, and can be selected from 45°, 50°, or 60°.

In a specific implementation, the number of legs 41 can be set according to the connection strength requirements, and can be three, four or more. Multiple legs 41 are evenly distributed in a circumferential direction of the base 10. The bridge assembly 40 is connected to the inner wall surface 105 of the hub 1 through the second ends 412 of the legs 41. The legs 41 has an overall strip shape. The bridge assembly 40 with the above structure can better meet the connection strength between the energy storage unit 2 as a whole and the hub 1. Also, the bridge assembly 40 including multiple legs 41 has a better vibration resistance to further ensure safe operation of the wind turbine.

As an optional implementation, at least one leg 41 is provided with a cable fixing element 414. The cable fixing element 414 includes two or more fixing rings 414a spaced apart along the extending direction of the leg 41. A perforation 413 is provided in the leg 41 at a position corresponding to the cable fixing element 414.

Since there are a number of cables, pipelines or the like in the hub 1 of the wind turbine, the cables, the pipelines or the like can pass through the perforation 413. The cable fixing element 414 can fix the cables, the pipelines or the like on the corresponding leg 41, and thus prevent disorganized arrangement of the cables, the pipelines or the like. It ensures that the cables, the pipelines or the like will not be twisted together when the hub 1 rotates and enables reliable connection to corresponding components, thereby ensuring the safety of the wind turbine. Also, the cable fixing element 414 is provided to include two or more fixing rings 414a spaced apart along the extending direction of the leg 41, such that the cable fixing element 414 not only meets the requirements for fixing cables and pipelines, but also serves as a ladder for workers to climb and overhaul the accumulator 200 or other devices.

In a specific implementation, the cable fixing element 414 and the perforation 413 may be provided on only one leg 41, or the cable fixing elements 414 and the perforations 413 may be provided on all the legs 41. Specifically, it can be set according to the arrangement of cables and pipelines in the hub 1.

Figure 9:
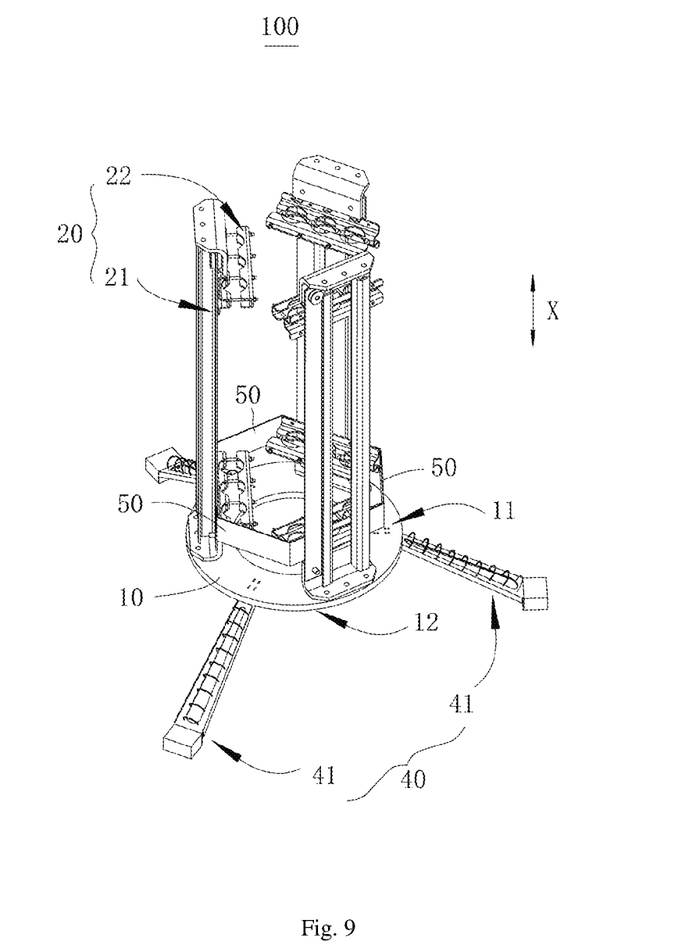
FIG. 9 is a structural schematic diagram of a mounting frame according to another embodiment of the disclosure.

Please refer to FIG. 9. FIG. 9 shows a structural schematic diagram of a mounting frame 100 according to another embodiment of the disclosure. As an optional implementation, the mounting frame 100 further includes a valve block fixing base 50. The valve block fixing base 50 is connected between at least two adjacent accumulator mounting elements 20. When the accumulators 200 are connected to corresponding hydraulic actuators, valves are required to control opening, closing and flow rates of the accumulators 200, thus the valve block fixing base 50 can facilitate installing of the valves for controlling the accumulators 200.

The valve block fixing base 50 can adopt different structures, as long as it can meet the installation requirement for the valve. In some optional examples, the valve block fixing base 50 may be a plate-shaped member connected to the supporting assemblies 21 of two adjacent accumulator mounting elements 20. In order to ensure the connection strength with the corresponding supporting assemblies 21, the valve block fixing base 50 is bent at two ends near the supporting assembly 21 in a direction close to the accumulator mounting element 20 and is connected to the corresponding supporting assembly 21. There may be one valve block fixing base 50, or the number of the valve block fixing base 50 may be the same as the number of the accumulator mounting elements 20, i.e., valve block fixing bases 50 are provided between every two adjacent accumulator mounting elements 20.

The valves for controlling respective accumulators 200 may be commercially available parts. Also, in order to better control the accumulator 200 and facilitate the installation and management of the valves, as an optional implementation, the energy storage unit 2 according to embodiments of the disclosure further includes a valve block 300. The valve block 300 is a control valve assembly in which multiple control valves are integrated in an installation box. When the mounting frame 100 includes the valve block fixing base 50, the valve block 300 is preferably connected to the valve block fixing base 50. The valve blocks 300 and the accumulator mounting elements 20 may be the same in number and provided in one-to-one correspondence. Each valve block 300 is connected to the accumulators 200 which are fixedly clamped by the corresponding accumulator mounting element 20. Also, in some optional examples, the number of the valve blocks 300 may be less than the number of the accumulator mounting elements 20, i.e., one valve block 300 may control accumulators 200 on two or more accumulator mounting elements 20, as long as the control requirements for respective accumulators 200 can be satisfied.

It can be understood that the above embodiments are illustrated by taking three accumulator mounting elements 20 of the mounting frame 100 as an example, which is an optional implementation. However, the disclosure is not limited to this. In some other examples, there may be two, four or even more accumulator mounting element 20.

It can be understood that the number of the holding holes 223 of each holding assembly 22 is not limited to three, but may also be two, four or even more, and may be specifically determined according to the number of accumulators 200 corresponding to the equipped hydraulic actuators.

Preferably, please refer to FIGS. 1 and 3. A rotation axis 100a of the mounting frame 100 coincides with the rotation axis 106 of the hub 1, such that the hub 1 can rotate smoothly. As shown in FIG. 3, the rotation axis 100a of the mounting frame 100 is perpendicular to the mounting surface 11 of the base 10. In one example, the base 10 is provided with a through hole 13 extending through the mounting surface 11, and the rotation axis 100a of the mounting frame 100 may be the axis of the through hole 13.

Therefore, the mounting frame 100 according to embodiments of the disclosure includes a base 10 and two or more accumulator mounting elements 20, the base 10 includes a mounting surface 11 in its thickness direction X, and the two or more accumulator mounting elements 20 are disposed at intervals on the mounting surface 11. The mounting frame 100 can be provided for installation of the accumulator 200. Specifically, the accumulators 200 corresponding to the hydraulic actuators for respective blades of the wind turbine can be clamped and fixed to the mounting surface 11. The accumulators 200 corresponding to the hydraulic actuators for respective blades of the wind turbine can all be mounted to the mounting frame 100, which results in intensively mounting, compact structure and small footprint. More importantly, it is possible to mount all the accumulators 200 to the corresponding accumulator mounting elements 20, and then move the mounting frame 100 containing respective accumulators 200 into the internal space 101 of the hub 1 and connect the mounting frame 100 to the inner wall surface 105. Such installation is simple. Moreover, when one or two or more of the accumulators 200 are damaged, the maintenance may be carried out only after the hub 1 is locked.

The energy storage unit 2 according to embodiments of the disclosure includes the mounting frame 100 according to the above embodiments, and thus can provide power to multiple hydraulic actuators and may be conveniently mounted to the hub 1. Also, the maintenance for the accumulators of the energy storage unit 2 can be conveniently carried out. Since the pitch system and the wind turbine according to embodiments of the disclosure include the energy storage unit 2 according to the above embodiments, it can be ensured that the maintenance for the respective accumulators can be conveniently carried out, while the pitch varying requirements for the blades of the wind turbine are satisfied.

In the above embodiments, the energy storage unit 2 according to embodiments of the disclosure may be located at different positions in the internal space 101 of the hub 1. Optionally, when the energy storage unit 2 is mounted to the wheel hub 1, all the supporting assemblies 21 of the accumulator mounting elements 20 may be connected to the inner wall surface 105 of the hub 1, or only some of the supporting assemblies 21 of the accumulator mounting elements 20 may be connected the inner wall surface 105 of the hub 1, as long as the connection strength between the energy storage unit 2 and the hub 1 can be ensured. Also, after the energy storage unit 2 is mounted to the hub 1, the thickness direction X of the base 10 intersects the extending directions of the axes of respective blade mounting holes 102. With such position arrangement, the energy storage unit 2 imposes less impact on forces applied on the hub 1 when the hub 1 rotates, and the service life of the hub 1 is ensured.

Please refer to FIG. 1 and FIG. 2. As an optional implementation, after the energy storage unit 2 is mounted to the hub 1, a rotation axis 201 of the energy storage unit 2 coincides with the rotation axis 106 of the hub 1, and two or more accumulator mounting elements 20 are evenly distributed around the axis of the manhole 103, such that the hub 1 can rotate smoothly. Moreover, since the energy storage unit 2 is disposed near the rotation axis 106 of the hub 1, the rotation radius of the energy storage unit 2 is small. Therefore, the centrifugal force generated by the storage unit is small, and the load level of the entire machine can be further reduced.

Please refer to FIG. 1 to FIG. 9, embodiments of the disclosure further provide a method for mounting an energy storage unit 2, including the following steps:

providing a mounting frame 100, which may be the mounting frame 100 according to the above embodiments;

mounting an accumulator 200, wherein the accumulator 200 is mounted on an accumulator mounting element 20 such that the accumulator 200 is clamped in a holding assembly 22 of the accumulator mounting element 20 in which the accumulator 200 is located and thus an energy storage unit 2 is formed; and mounting the energy storage unit 2, wherein the energy storage unit 2 as a whole is moved into an internal space 101 of a hub 1 and connected to an inner wall surface 105 of the hub 1 through a base 10 and a supporting assembly 21.

In the step of mounting the energy storage unit 2, the energy storage unit 2 as a whole is moved into the hub 1 through a generator shaft hole 104 and is connected to the inner wall surface 105 of the hub 1 through the base 10 and the supporting assembly 21, and the rotation axis 201 of the energy storage unit 2 coincides with the rotation axis 106 of the hub 1.

The method for mounting the energy storage unit 2 according to embodiments of the disclosure provides the mounting frame 100; mounts all the accumulators 200 corresponding to the hydraulic actuators for the blades of the wind turbine to the corresponding accumulator mounting elements 20 so as to form the energy storage unit 2; and then moves the energy storage unit 2 as a whole into the internal space 101 of the hub 1, connects the energy storage unit 2 to the inner wall surface 105 of the hub 1. There is no need to mount the accumulators 200 corresponding to the respective hydraulic actuators in the hub 1 individually or in groups, which can effectively save the installation time of the accumulators 200 for the respective hydraulic actuators of the wind turbine.

Furthermore, the energy storage unit 2 as a whole is moved into the internal space 101 through the generator shaft hole 104 of the hub 1, which is more convenient to operate and further saves the installation and maintenance time of the respective accumulators 200. Also, since all the accumulators 200 corresponding to the respective hydraulic actuators are arranged in the mounting frame 1, the maintenance can be carried out only after the hub 1 is locked. When the rotation axis 201 of the energy storage unit 2 coincides with the rotation axis 106 of the hub 1, the hub 1 can rotate smoothly. Moreover, since the energy storage unit 2 is disposed near the rotation axis 106 of the hub 1, the rotation radius of the energy storage unit 2 is small. Therefore, the centrifugal force generated by the energy storage unit 2 is small, and the load level of the entire machine can be further reduced.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A mounting frame for mounting accumulators in a hub, comprising:
   a base having a predetermined thickness, wherein the base comprises a mounting surface in a thickness direction of the base;
   two or more accumulator mounting elements disposed on the mounting surface at intervals, wherein; each accumulator mounting element comprises a supporting assembly and a holding assembly connected to the supporting assembly, the supporting assembly is connected to the mounting surface and extends in the thickness direction, and the holding assembly is adapted to clamp and fix at least one of the accumulators that corresponds to the accumulator mounting element; and the accumulators in the hub are mounted to the mounting frame; and
   a valve block fixing base connected between at least two adjacent accumulator mounting elements of the two or more accumulator mounting elements.

2. The mounting frame according to claim 1, wherein the holding assembly comprises a first holding element and a second holding element which are oppositely disposed and connected to each other, the holding assembly is connected to the supporting assembly through the second holding element, the first holding element and the second holding element together form at least one holding hole having an axis extending in the thickness direction, and the at least one of the accumulators is clamped and fixed in the at least one holding hole.

3. The mounting frame according to claim 2, wherein the first holding element comprises at least one first recess arranged side by side in a first direction, the second holding element comprises at least one second recess, the at least one second recess corresponds to the at least one first recess with one-to-one relation, the first holding element and the second holding element are detachably connected, the at least one first recess and the at least one second recess that are correspondingly disposed form the at least one holding hole, and the first direction intersects the thickness direction.

4. The mounting frame according to claim 3, wherein the first holding element and/or or the second holding element is provided with a limiting element extending in a second direction, the limiting element has a projection in the thickness direction which at least partially covers the at least one holding hole, and the second direction intersects the thickness direction.

5. The mounting frame according to claim 3, wherein the supporting assembly comprises two connecting plates and a supporting beam, the supporting beam extends in the thickness direction and is connected to the two connecting plates at respective ends of the supporting beam in the thickness direction, and the supporting assembly is connected to the mounting surface through one of the two connecting plates.

6. The mounting frame according to claim 5, wherein the supporting beam adopts a channel steel structure with an open groove, and an elastic support is provided in the open groove or between the supporting beam and at least one of the two connecting plates.

7. The mounting frame according to claim 6, wherein the base further comprises a fixing surface opposite to the mounting surface in the thickness direction, the mounting frame further comprises a bridge assembly connected to the fixing surface, and the base is adapted to be supported by the bridge assembly and connected to the inner wall surface of the hub.

8. The mounting frame according to claim 7, wherein the bridge assembly comprises a plurality of legs, each of which comprises a first end and a second end that are opposite to each other, the first ends of the legs are all connected to the fixing surface, and the second ends extend away from each other, and an extending direction of the leg intersects the thickness direction with an angle a, wherein $30°\leq a<90°$.

9. The mounting frame according to claim 2, wherein the first holding element and/or or the second holding element is provided with a limiting element extending in a second direction, the limiting element has a projection in the thickness direction which at least partially covers the at least one holding hole, and the second direction intersects the thickness direction.

10. The mounting frame according to claim 1, wherein the supporting assembly comprises two connecting plates and a supporting beam, the supporting beam extends in the thickness direction and is connected to the two connecting plates at respective ends of the supporting beam in the thickness direction, and the supporting assembly is connected to the mounting surface through one of the two connecting plates.

11. The mounting frame according to claim 10, wherein the supporting beam adopts a channel steel structure with an open groove, and an elastic support is provided in the open groove and/or or between the supporting beam and at least one of the two connecting plates.

12. The mounting frame according to claim 1, wherein the base further comprises a fixing surface opposite to the mounting surface in the thickness direction, the mounting frame further comprises a bridge assembly connected to the fixing surface, and the base is adapted to be supported by the bridge assembly and connected to an inner wall surface of the hub.

13. The mounting frame according to claim 12, wherein the bridge assembly comprises a plurality of legs, each of which comprises a first end and a second end that are opposite to each other, the first ends of the legs are all connected to the fixing surface, and the second ends extend away from each other, and an extending direction of each leg intersects the thickness direction with an angle a, wherein $30°≤a<90°$.

14. The mounting frame according to claim 13, wherein at least one leg is provided with a cable fixing element, the cable fixing element comprises two or more fixing rings spaced apart along the extending direction of the at least one leg, and a perforation is provided in the at least one leg at a position corresponding to the cable fixing element.

15. The mounting frame according to claim 1, wherein a rotation axis of the mounting frame coincides with a rotation axis of the hub.

16. An energy storage unit comprising:
a plurality of accumulators; and
a mounting frame comprising:
   a base having a predetermined thickness, wherein the base comprises a mounting surface in a thickness direction of the base;
   two or more accumulator mounting elements disposed on the mounting surface at intervals, wherein; each accumulator mounting element comprises a supporting assembly and a holding assembly connected to the supporting assembly, the supporting assembly is connected to the mounting surface and extends in the thickness direction, and the holding assembly of the accumulator mounting element is adapted to clamp and fix at least one of the plurality of accumulators that corresponds to the accumulator mounting element; and
   a valve block fixing base connected between at least two adjacent accumulator mounting elements of the two or more accumulator mounting elements.

17. The energy storage unit according to claim 16, wherein the energy storage unit further comprises a valve block for each accumulator mounting element, which is disposed on the accumulator mounting element and is connected to the at least one of the plurality of accumulators corresponding to the accumulator mounting element.

18. A method for mounting an energy storage unit, comprising:
providing a mounting frame, which comprises a base and two or more accumulator mounting elements, wherein the base has a predetermined thickness and comprises a mounting surface in a thickness direction of the base, the two or more accumulator mounting elements are disposed on the mounting surface at intervals, each accumulator mounting element comprises a supporting assembly and a holding assembly connected to the supporting assembly, the supporting assembly is connected to the mounting surface and extends in the thickness direction, and the mounting frame further comprises a valve block fixing base connected between at least two adjacent accumulator mounting elements of the two or more accumulator mounting elements,
mounting an accumulator on a respective accumulator mounting element such that the accumulator is clamped in the holding assembly of the respective accumulator mounting element in which the accumulator is located and thus an energy storage unit is formed; and
mounting the energy storage unit, wherein the energy storage unit is moved into an internal space of the hub and connected to an inner wall surface of the hub through the base and the supporting assembly.

19. The method according to claim 18, wherein the energy storage unit as a whole is moved into the internal space through a generator shaft hole of the hub and connected to the inner wall surface of the hub through the base and the supporting assembly, and a rotation axis of the energy storage unit coincides with a rotation axis of the hub.

* * * * *